April 30, 1963     S. R. ARNO     3,087,172
RECUMBENT BACK SUPPORTS
Filed May 4, 1959

INVENTOR.
Samuel Rock Arno

United States Patent Office 3,087,172
Patented Apr. 30, 1963

3,087,172
RECUMBENT BACK SUPPORTS
Samuel R. Arno, 64 Overlook Road, Randolph, Mass.
Filed May 4, 1959, Ser. No. 810,723
2 Claims. (Cl. 5—360)

This invention relates generally to portable back supports and particularly to back supports adapted to be removably mounted on the conventional passenger seat of an automobile. Briefly, the device is an upholstered rigid flat supporting member designed to fit angularly upon an automobile passenger seat so that a passenger can lie backward upon it.

An object of this invention is to introduce an upholstered device enabling the automobile passenger to recline himself backwards and provide recumbent means for relaxation conducive to such comfort as to induce sleep during lengthy travel hitherto impossible without undue discomfort with the conventional seats.

Another object is to provide a versatile upholstered back support for use in home or hospital beds, on couches, divans and other seating devices.

The principal object of this invention is to provide a novel and inexpensive reclining back support that will allow its use in either the forward or back passenger seat of an automobile and so render a lengthy trip less tedious to the passenger due to the added relaxation afforded by the device.

Other uses, advantages and applications will be more apparent upon the examination of the drawings in which:

FIGURE 1 of the drawings is a front elevational view of the rigid supporting member employed for the upholstered device.

Figure 1:
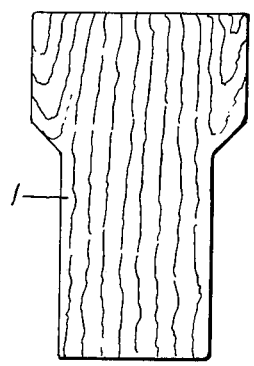
Figure 2:
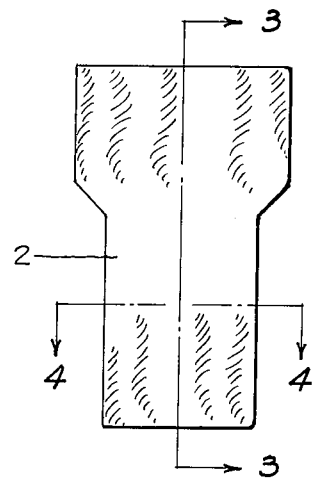
FIGURE 2 is a front elevational view of the finished back support.
Figure 3:
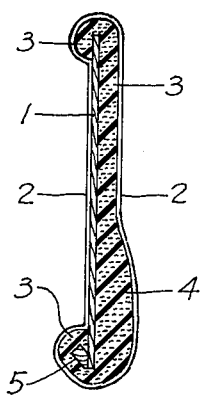
FIGURE 3 is a sectional view of the device taken along line 3—3 of FIGURE 2.
Figure 5:
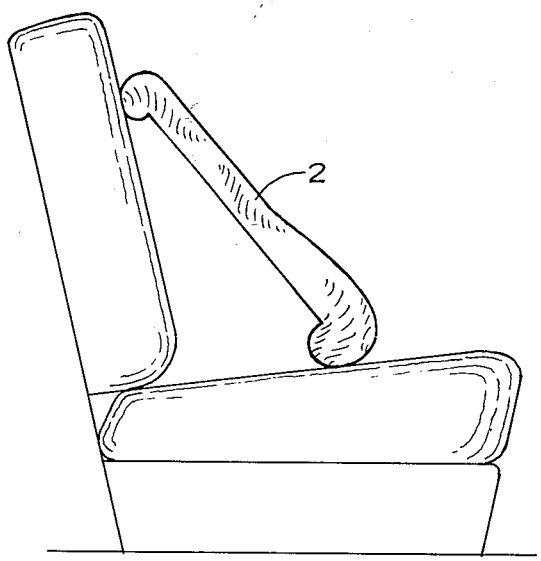
FIGURE 5 is a side elevational view of the back support depicting the proper position, ready for use, upon a passenger seat of an automobile.
Figure 4:
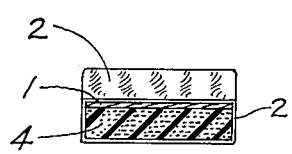
FIGURE 4 is a sectional view taken along line 4—4 of FIGURE 2.

The rigid, supporting member 1, as shown, is made of plywood and is cut to an approximate T shape so that this part of the back support will be wide enough to embrace the shoulder blades of the user, and also avoid an otherwise unsightly design. It is found that 21" is an ideal length for the rigid member 1. The base 5 is a wooden board angular appendage with a 28 degree cut at the attached end and provides a flatter base under the padding 3 for resting upon the seat. Due to the added expense of manufacture this base 5 may be omitted without materially affecting practicability. The member 1 can also be made of a rigid plastics in which event the base 5 will be one continuous molded or formed extension terminating in an inward loop corresponding to the drawing 5 in its base forming application. Further, the necessity for the additional padding 4 may also be obviated, since this contour can be duplicated in the molding or forming process. The compressable padding 3 may be the least costly cotton padding or the more costly rubber or plastic foam, or even a pre-shaped air cushion. This padding is draped and tacked around both ends of the device as shown in FIGURE 3 in order to cushion them. The lateral edges of the rigid member 1 may be taped or otherwise inexpensively covered to avoid cutting into the finished covering 2. The compressable padding 4 is doubled or increased in thickness at the lower extremity as shown in FIGURE 3 in order to provide full contact and lower back support, since the angle at which the device must be placed upon the seat causes a little gap between the lower back and the device. The finished covering 2 should be a long wearing material such as sailcloth and is pre-cut to the corresponding shape 1, and draped or fitted around all edges overlapping partly upon the back portion where it is tacked. A backing material corresponding to the shape of the device is then tacked on said back portion for finished effect. In the sectional view taken along lines 3—3 the supporting member 1, the finish covering 2, the padding and its overlapping 3, the additional padding 4, and the base forming member 5 are shown in detailed form and depict the proper order of application and correlation. The sectional view taken along lines 4—4 shows the length of the additional padding which should be about nine inches, a tapering of said additional padding at the upper portion, and also the related application of the components.

In use, the back support is placed base 5 down, upholstered side exposed, at an approximate forty-five degree angle upon the passenger seat of an automobile, though the angle may be adjusted according to individual preference. By sitting close to the forward edge of the said seat and setting the device as stated behind one and then leaning backward so that the head and part of the shoulders rest upon the upright portion of said seat, a recumbent back support is provided otherwise unattainable except in those automobiles provided with a reclining back rest in the forward seat. It is found that since the body weight is evenly distributed along the surface of the device, the fact that the user must seat himself well forward on the seat does not add any undue discomfort.

Having thus described my invention I claim:

1. A recumbent back support comprising, in combination, a flat, longitudinally and laterally rigid supporting member having an upper linear edge and a lower linear edge, said supporting member being wider at its upper edge than at its lower edge, compressible padding extending over the entire front surface of said supporting member and over the upper and lower edges and onto the adjacent rear surface thereof, and a covering over the padding and supporting member.

2. A recumbent back support according to claim 1, wherein the back support is T-shaped, and the padding on the front surface of the supporting member adjacent to the lower edge is of increased thickness.

References Cited in the file of this patent

UNITED STATES PATENTS

| | | |
|---|---|---|
| 1,457,245 | Harley | May 29, 1923 |
| 2,188,421 | Wade | Jan. 30, 1940 |
| 2,667,210 | Eames | Jan. 26, 1954 |
| 2,716,443 | Laughlin | Aug. 30, 1955 |
| 2,769,485 | Shapiro | Nov. 6, 1956 |
| 2,782,839 | Cole | Feb. 26, 1957 |
| 2,807,313 | Kaufman | Sept. 24, 1957 |
| 2,853,122 | Shapiro | Sept. 23, 1958 |

FOREIGN PATENTS

| | | |
|---|---|---|
| 243,994 | Great Britain | Dec. 10, 1925 |